United States Patent
Doukai et al.

(10) Patent No.: US 8,199,639 B2
(45) Date of Patent: Jun. 12, 2012

(54) PATH PROTECTION METHOD AND LAYER-2 SWITCH

(75) Inventors: Masami Doukai, Kawasaki (JP); Ko Takatori, Kawasaki (JP); Kenichi Kawarai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1223 days.

(21) Appl. No.: 11/337,609

(22) Filed: Jan. 24, 2006

(65) Prior Publication Data

US 2007/0086333 A1 Apr. 19, 2007

(30) Foreign Application Priority Data

Oct. 18, 2005 (JP) ................................. 2005-303363

(51) Int. Cl.
*H04J 3/14* (2006.01)
(52) U.S. Cl. ........................................ 370/228; 370/351
(58) Field of Classification Search .................. 370/216, 370/225, 228
See application file for complete search history.

(56) References Cited

U.S. PATENT DOCUMENTS

| | | | | |
|---|---|---|---|---|
| 7,394,810 | B2* | 7/2008 | Natsume et al. | 370/392 |
| 2004/0004937 | A1* | 1/2004 | Skalecki et al. | 370/227 |
| 2005/0249124 | A1* | 11/2005 | Elie-Dit-Cosaque et al. | 370/242 |
| 2007/0071011 | A1* | 3/2007 | de Heer et al. | 370/395.53 |
| 2007/0147231 | A1* | 6/2007 | Yoshida et al. | 370/216 |
| 2008/0095045 | A1* | 4/2008 | Owens et al. | 370/220 |
| 2009/0034422 | A1* | 2/2009 | Pasio | 370/244 |

FOREIGN PATENT DOCUMENTS

JP 2003-258829 9/2003

* cited by examiner

*Primary Examiner* — Nittaya Juntima
*Assistant Examiner* — Henry Baron
(74) *Attorney, Agent, or Firm* — Fujitsu Patent Center

(57) ABSTRACT

A method of providing path protection includes setting a working path and a protection path by identifying, as a single path, a set of a control-purpose virtual network identifier and at least one virtual network identifier that are assigned to one or more users at a section defined as a point-to-point connection in a virtual network, and switching between the working path and the protection path.

14 Claims, 17 Drawing Sheets

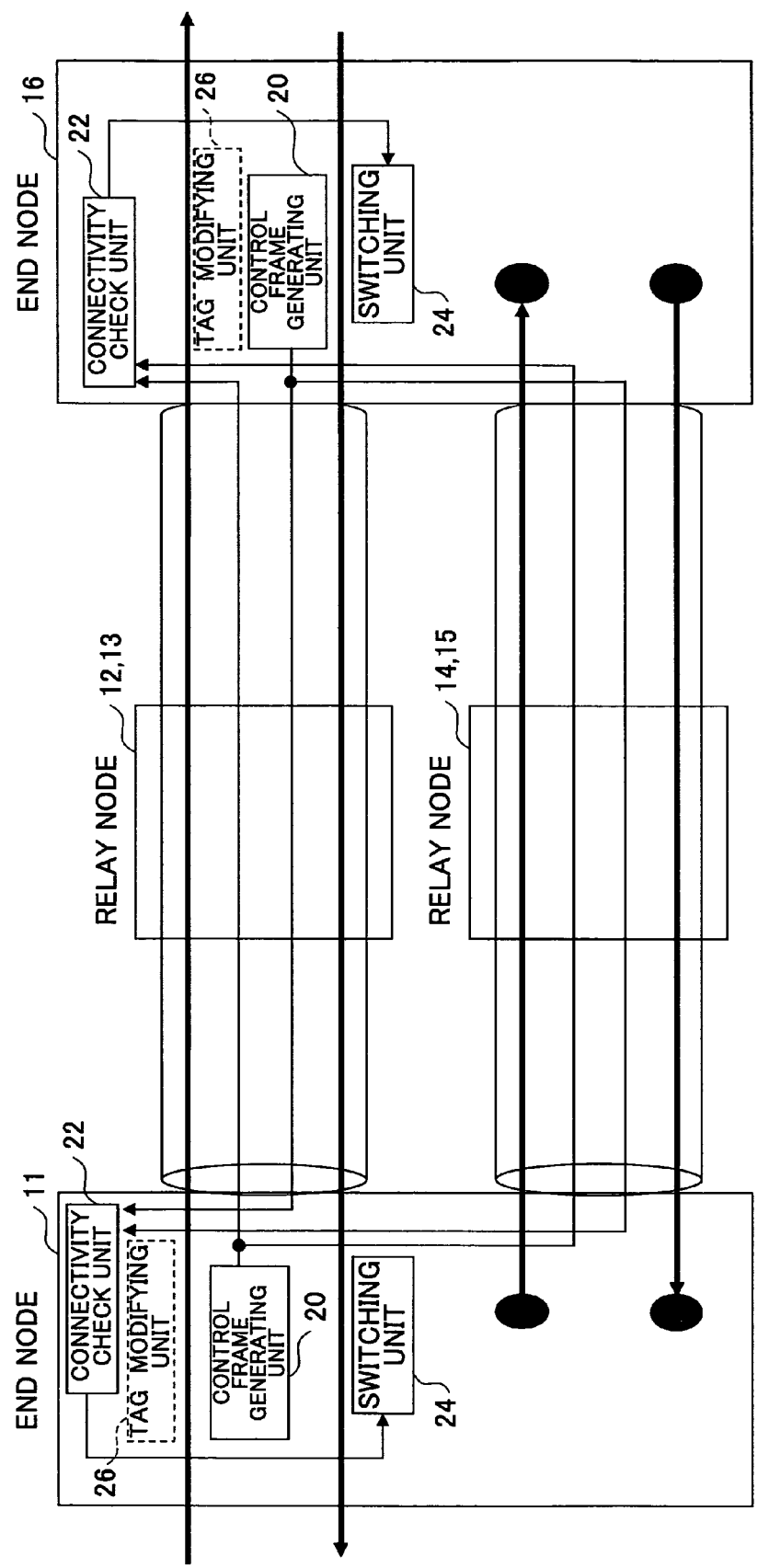

END NODE 11    RELAY NODE    END NODE 16

END NODE 11    RELAY NODE    END NODE 16

FIG.8

| | FIELD PORTION | | SETTING |
|---|---|---|---|
| MAC PORTION | DESTINATION MAC ADDRESS | 6 BYTE | ANY VALUE SELECTED SEPARATELY FOR EACH PROTECTION PATH, WITH SPECIAL MULTICAST MAC ADDRESS SUCH AS 01-00-0E-00-00-01 SERVING AS INITIAL VALUE |
| | SOURCE MAC ADDRESS | 6 BYTE | MAC ADDRESS OF APPARATUS |
| | ETHER TYPE 1 | 2 BYTE | ANY VALUE SET FOR PORT, WITH 0x8100 SERVING AS INITIAL VALUE |
| | TCI | 1 BIT | FIXED TO 0 |
| | CoS | 3 BIT | ANY VALUE SELECTED SEPARATELY FOR EACH PROTECTION PATH, WITH HIGH PRIORITY AND LOW DISPOSAL "6" SERVING AS INITIAL VALUE |
| | VID | 12 BIT | VID VALUE OF MANAGEMENT VLAN SET TO PROTECTION PAIR OF WORKING PATH AND PROTECTION PATH |
| CONTROL PORTION | ETHER TYPE 2 | 2 BYTE | SPECIAL NUMBER (0xAAAA) |
| | SUB TYPE | 1 BYTE | OAM SUB TYPE (FIXED TO 0x10) |
| | FLAGS | 2 BYTE | FLAG (FIXED TO 0) |
| | CODE | 1 BYTE | TYPE (FIXED TO NOTIFICATION(3)) |
| | TTL | 1 BYTE | RESIDUAL TIME-TO-LIVE COUNT (STARTING FROM 0xFF) |
| | TTL BASE | 1 BYTE | INITIAL VALUE OF TIME-TO-LIVE COUNT (FIXED TO 0xFF) |
| | SEQUENCE NUMBER | 2 BYTE | INCREMENTED BY ONE TO INDICATE A CHANGE WHEN THERE IS A CHANGE IN INFORMATION FOLLOWING PATH NO. |
| | PATH NO | 4 BYTE | PROTECTION NUMBER ON TRANSMISSION SIDE |
| | APS1 | 1 BYTE | CONTROL PROTOCOL |
| | APS2 | 1 BYTE | CONTROL PROTOCOL |
| | RESERVED | 18 BYTE | BACKUP (SET TO 0 REQUIRED) |

FIG.9

| | | |
|---|---|---|
| CONTROL FRAME TRANSMISSION | TRANSMISSION INTERVAL | TRANSMISSION AT Ttx-SECOND INTERVALS SET ON A SYSTEM-SPECIFIC BASIS |
| | TRANSMISSION POINT | PORT (EGRESS) INCLUDING WORKING/PROTECTION PATH (ONE OF PORTS IN THE CASE OF LINK AGGREGATION) |
| | TRANSMISSION TRIGGER | AT Ttx-SECOND INTERVAL OR AT TIME OF SWITCHING EVENT THAT OCCURS ASYNCHRONOUSLY |
| CONTROL FRAME RECEPTION | RECEPTION INTERVAL | RECEPTION AT Ttx-SECOND INTERVALS SET ON A SYSTEM-SPECIFIC BASIS, FOLLOWED BY COMPARISON OF TRANSFERRED INFORMATION TRANSITION TO CC UNDETECTED STATE IN RESPONSE TO RECEPTION OF NO CONTROL FRAMES FOR THREE TIMES PERFORMING SWITCHING IN RESPONSE TO APS SWITCH INSTRUCTION OF CONTROL FRAME PERFORMING SWITCHING IN RESPONSE TO RDI NOTICE OF CONTROL FRAME TRANSITION TO CC RECOVERY IN RESPONSE TO RECEPTION OF CONTROL FRAME IN CC UNDETECTED STATE |
| | RECEPTION POINT | PORT (INGRESS) INCLUDING WORKING/PROTECTION PATH (ONE OF PORTS IN THE CASE OF LINK AGGREGATION) |

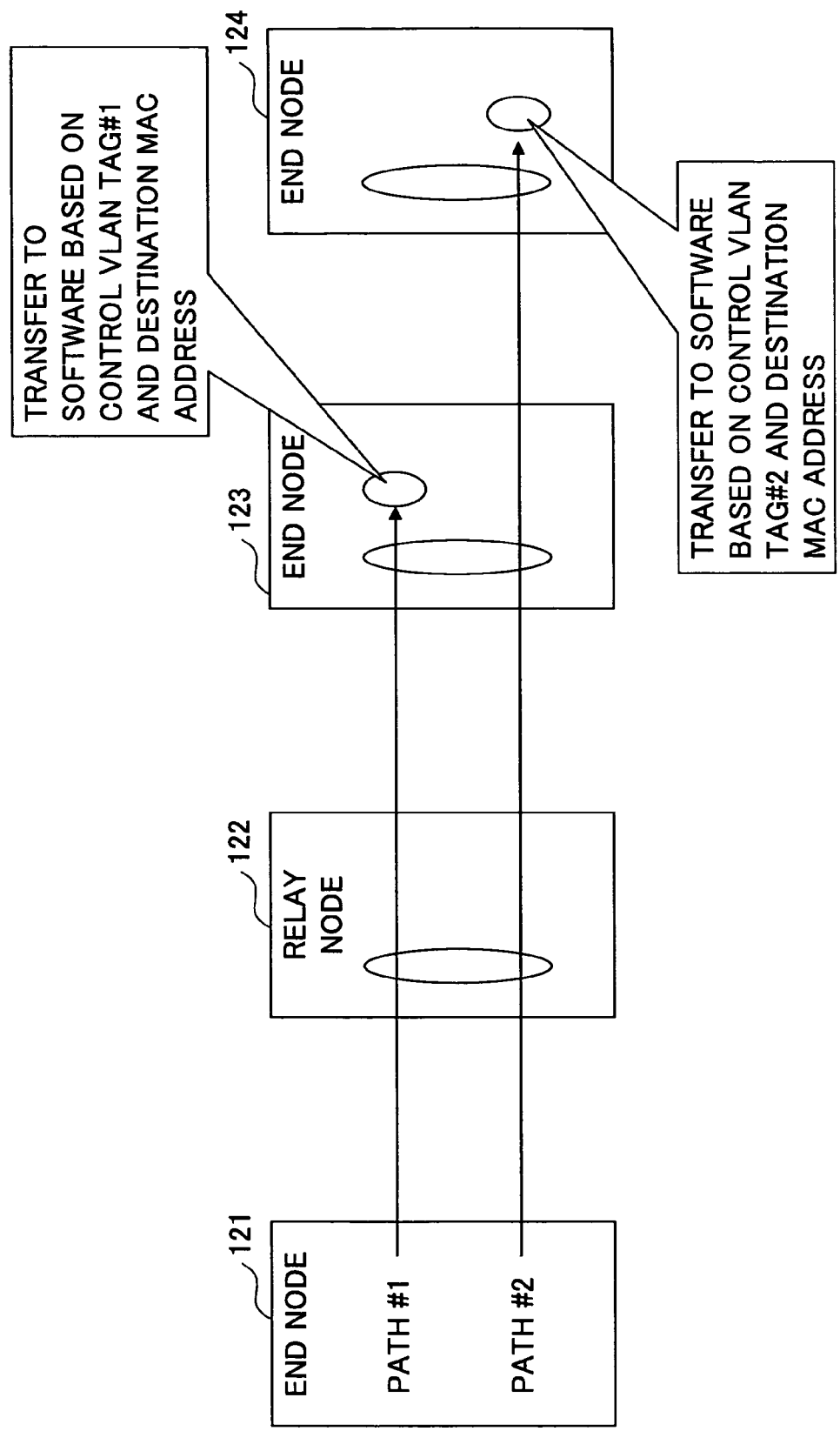

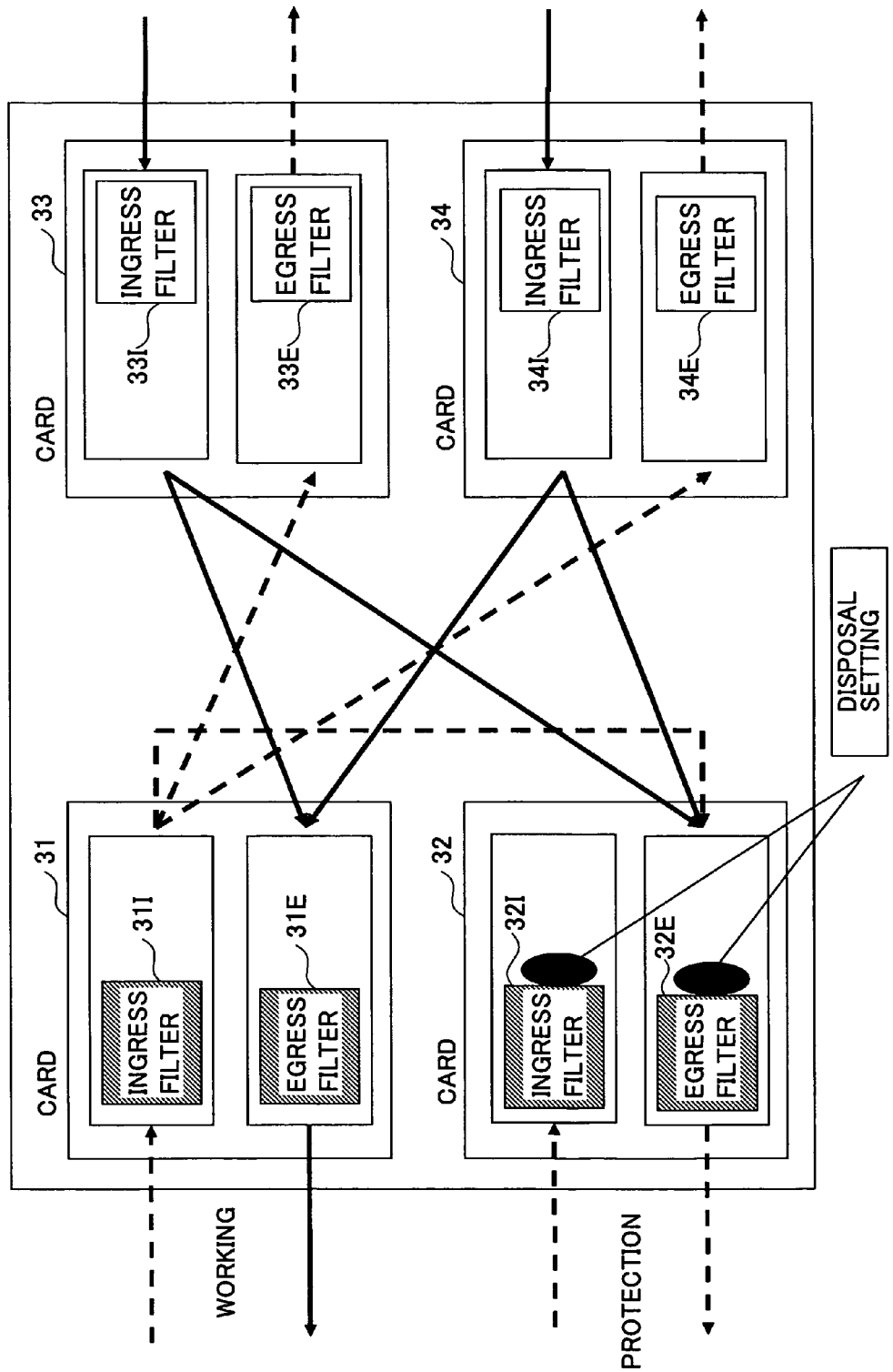

FIG.14A

| CAUSE | DETAIL OF CAUSE |
|---|---|
| LOC (LOSS OF CC) | NO CC RECEPTION FOR THREE TIMES IN A ROW WHEN CC (CONTINUITY CHECK) IS TRANSMITTED AT RECEPTION INTERVALS |
| APS | RECEPTION OF INSTRUCT TO SWITCH (INSTANTANEOUS) |
| PHYSICAL FAULT | MALFUNCTION/REMOVAL OF CHARD HAVING PORT INCLUDING WORKING/PROTECTION PATH, STOPPAGE OF OPTICAL INPUT INTO PORT INCLUDING WORKING/PROTECTION PATH, 10B8B CONVERSION ERROR, FREQUENT OCCURRENCES OF FCS ERROR, FAILURE/REMOVAL OF SFP (SMALL FORM FACTOR PLUGGABLE) MODULE |
| MAINTENANCE SWITCHING | OPERATOR-SWITCHING REQUEST COMMAND |

FIG.14B

| CAUSE | DETAIL OF CAUSE |
|---|---|
| CC | TIME OF CC RECEPTION (INSTANTANEOUS) |
| APS | RECEPTION OF INSTRUCT TO SWITCH (INSTANTANEOUS) |
| PHYSICAL FAULT | MALFUNCTION/REMOVAL OF CHARD HAVING PORT INCLUDING WORKING/PROTECTION PATH, STOPPAGE OF OPTICAL INPUT INTO PORT INCLUDING WORKING/PROTECTION PATH, 10B8B CONVERSION ERROR, FREQUENT OCCURRENCES OF FCS ERROR FAILURE/REMOVAL OF SFP MODULE. |

FIG.15

DATA ELEMENT

| SYSTEM-SPECIFIC | |
|---|---|
| · CONTROL-PURPOSE MAC ADDRESS | (USE IN TRANSMISSION/RECEPTION OF CONTROL FRAME) |
| · CONTROL-PURPOSE ETHER TYPE | (USE IN TRANSMISSION/RECEPTION OF CONTROL FRAME) |
| · CONTROL-FRAME-PURPOSE COS | (USE IN TRANSMISSION OF CONTROL FRAME) |

| PROTECTION-SPECIFIC | |
|---|---|
| · PROTECTION LINK TYPE | |
| (PORT LINK AGGREGATION) | |
| · PROTECTION VLAN TAG LIST | (USE IN DATA CONNECTIVITY) |
| · PROTECTION START INSTRUCTION | |
| (START/END) | (USE IN SWITCHING CONTROL) |
| · PROTECTION STATE | |
| (OPERATING, CLOSING, UNUSED) | |
| · SELECTED PATH | |
| (WORKING PATH/PROTECTION PATH) | (USE IN SWITCHING CONTROL) |
| · SWITCHBACK TIMER (IN INCREMENTS OF MINUTES) | |
| · CONTROL FRAME TRANSMISSION INTERVAL | |
| (IN INCREMENTS OF MILLISECONDS) | (USE IN TRANSMISSION OF CONTROL FRAME) |
| · CONTROL FRAME RECEPTION INTERVAL AND | |
| (IN INCREMENTS OF MILLISECONDS) | (USE IN TRANSMISSION OF CONTROL FRAME) |
| · LINK INCLUSIVE OF WORKING PATH | |
| · WORKING PATH STATE | |
| (OPERATING, FAULT, CLOSING, UNUSED) | |
| · CONTROL-PURPOSE VLAN TAG | (USE IN TRANSMISSION/RECEPTION OF CONTROL FRAME) |
| · CONTROL FRAME TRANSMISSION INSTRUCTION | (USE IN TRANSMISSION OF CONTROL FRAME) |
| (START/STOP) | |
| · CONTROL FRAME RECEPTION INSTRUCTION | (USE IN RECEPTION OF CONTROL FRAME) |
| (START/STOP) | |
| · VLAN STACKING (ENABLED/DISABLED) | (USE IN DATA CONNECTIVITY) |
| · LINK INCLUSIVE OF PROTECTION PATH | |
| · PROTECTION PATH STATE | |
| (OPERATING, FAULT, CLOSING, UNUSED) | |
| · CONTROL-PURPOSE VLAN TAG | (USE IN TRANSMISSION/RECEPTION OF CONTROL FRAME) |
| · CONTROL FRAME TRANSMISSION INSTRUCTION | (USE IN TRANSMISSION OF CONTROL FRAME) |
| (START/STOP) | |
| · CONTROL FRAME RECEPTION INSTRUCTION | (USE IN RECEPTION OF CONTROL FRAME) |
| (START/STOP) | |
| · VLAN STACKING | (USE IN DATA CONNECTIVITY) |
| (ENABLED/DISABLED) | |

| PORT-SPECIFIC |
|---|
| · PORT STATE |
| (OPERATING, FAULT, CLOSING, UNUSED) |
| · PROTECTION PATH USE LIST |
| · PERMITTED VLAN TAG LIST |
| · USE OF LINK AGGREGATION |
| (IN USE/NOT IN USE) |

| LINK-AGGREGATION-SPECIFIC |
|---|
| · LINK STATE |
| (OPERATING, FAULT, CLOSING, UNUSED) |
| · PROTECTION PATH USE LIST |
| · PERMITTED VLAN TAG LIST |
| · PORT USE LIST |

FIG.16

EXAMPLE OF SETTINGS IN CASE OF FLAT DESIGN

0x01-00-0E-00-00-01
AA-AA
6 (EXAMPLE: HIGH PRIORITY)

PROTECTION #1
  PORT

TAG#1-9
START

OPERATING

WORKING PATH 0 (NO TIMER ACTIVATION)
100 (MILLISECONDS)
100 (MILLISECONDS)

PORT#1
OPERATING

TAG#10
START

START

DISABLED

PORT#2
OPERATING

TAG#10
START

START

DISABLED

| PORT#1<br>OPERATING<br><br>PROTECTION #1 CURRENTLY IN USE<br>TAG#1-9<br>NOT IN USE | PORT#2<br>OPERATING<br><br>PROTECTION #1 CURRENTLY IN USE<br>TAG#1-9<br>NOT IN USE |
|---|---|

FIG.17

EXAMPLE OF SETTINGS IN CASE OF STACK DESIGN

0x01-00-0E-00-00-01
AA-AA
6 (EXAMPLE: HIGH PRIORITY)

PROTECTION #2
  PORT

TAG#1-9
START

OPERATING

WORKING PATH 0 (NO TIMER ACTIVATION)
100 (MILLISECONDS)
100 (MILLISECONDS)

PORT#3
OPERATING

TAG#10
START

START

DISABLED

PORT#4
OPERATING

TAG#11
START

START

DISABLED

| PORT#3 OPERATING | PORT#4 OPERATING |
|---|---|
| PROTECTION #2 CURRENTLY IN USE TAG#1-9 NOT IN USE | PROTECTION #2 CURRENTLY IN USE TAG#1-9 NOT IN USE |

PATH PROTECTION METHOD AND LAYER-2 SWITCH

BACKGROUND OF THE INVENTION

1. Field of the Invention

The present invention generally relates to path protection methods and layer-2 switches, and particularly relates to a path protection method and a layer-2 switch used in a bridge network.

2. Description of the Related Art

Bridge networks were mainly used in LANs (Local Area Networks) in early days. Since then, their use has been spreading to carrier networks as signified by the fact that the bridge networks are now referred to as "wide-area Ethernet (registered trademark)".

When bridge networks are used for carrier networks, there is a demand for improvement in fault tolerance with respect to bridge networks, apparatuses constituting the bridge networks, and links between the apparatuses constituting the bridge networks.

To this end, redundancy configuration is employed at various levels, including redundancy in the channel cards of the apparatuses, redundancy in the control cards of the apparatuses, redundancy in links between the apparatuses, etc. Also, a redundancy protocol is used to collect network topologies for the purpose of path control.

Conventionally, when there is a need to achieve redundancy between an end and an end in a bridge network, the spanning tree protocol (which was the standard in versions prior to the 2004 version) or the rapid spanning tree protocol (which is the standard from the 2004 version) is used as defined in IEEE802.1D to achieve redundancy by use of layer-2 switches.

In the following, what is referred to as "spanning tree protocol" means the rapid spanning tree protocol. Since the functions of the spanning tree protocol are included in the rapid spanning tree protocol, a description will not be given with respect to the functions of these individual protocols separately.

A related-art bridge network will be described with reference to FIG. 1 and FIG. 2.

Switches #1 through #6 are layer-2 switches, which constitute a bridge network. The switch #1 and the switch #6 are connected to a user terminal or to a user network that is not controlled from the bridge-network side. The switch #1 and the switch #6 are called end nodes because they are located at the ends of the bridge network. The switches #2 through #5 have no connection to an external terminal or network. Since the switches #2 through #5 relay traffics passing through the bridge network, these switches are referred to as relay nodes.

The spanning tree protocol may be introduced in this bridge network to perform path control. In this case, as shown in FIG. 1, blocking ports BP#1, BP#2, and BP#3 are created at the locations where a physical loop is formed by the ports between the switches. Provision is then made such that frames other than those used in the spanning tree protocol cannot pass through these blocking ports. In this manner, a network topology that has no logical loop is constructed.

As shown in FIG. 2, a failure may occur at the link between the switch #2 and the switch #3. In such a case, the physical loop disappears, resulting in the blocking port #3 being changed into a forwarding port, thereby making a path change.

Patent Document 1 discloses the use of the VLAN ID (Virtual LAN Identifier) in the VLAN tag of an IEEE802.1Q frame as a logical identifier, thereby defining a P-P (point-to-point) connection between an edge and an edge as a P-P logical path.

[Patent Document 1] Japanese Patent Application Publication No. 2003-258829.

When a redundancy protocol such as the spanning tree protocol is used in a bridge network, the following problems may arise.

First, there is a need to make the same redundancy protocol operate at all the layer-2 switches constituting the bridge network. Because of this, it is extremely difficult to install the protocol in a currently operating network. Second, layer-2 switches that support a redundancy protocol are generally provided at higher per unit price, thereby requiring higher equipment investment.

Third, the redundancy protocol is controlled by software. While the software responsible for such control is being upgraded, switching may be performed at another layer-2 switch. This may affect the main signals. Forth, even if the VLAN tag standardized according to IEEE802.1Q is used, traffics may be concentrated on a single path since the network topology is not constructed on a per-VLAN-tag basis.

Fifth, a time length on the order of seconds may be required from the detection of failure in the network to the recovery from the failure (it may even be on the order of tens of seconds according to the original spanning tree protocol). Sixth, no traffic can go through a port serving as a blocking port. Because of this, the blocking ports cannot be used for the purpose of distributing the load.

Accordingly, there is a need for a path protection method and a layer-2 switch that can provide path protection by making low equipment investments that only expand the function of end nodes.

SUMMARY OF THE INVENTION

It is a general object of the present invention to provide a path protection method and a layer-2 switch that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a path protection method and a layer-2 switch particularly pointed out in the specification in such full, clear, concise, and exact terms as to enable a person having ordinary skill in the art to practice the invention.

To achieve these and other advantages in accordance with the purpose of the invention, one aspect of the invention provides a method of providing path protection, which includes setting a working path and a protection path by identifying, as a single path, a set of a control-purpose virtual network identifier and at least one virtual network identifier that are assigned to one or more users at a section defined as a point-to-point connection in a virtual network, and switching between the working path and the protection path. This achieves path protection simply by making low equipment investments that only expand the function of end nodes.

According to another aspect of the present invention, a method of providing path protection includes setting a working path and a protection path by identifying, as a single path, at least one virtual network identifier that is assigned to one or more users at a section defined as a point-to-point connection in a virtual network and that has a control-purpose virtual network identifier stacked therewith, and switching between the working path and the protection path. This achieves path protection simply by making low equipment investments that only expand the function of end nodes.

According to another aspect of the present invention, a layer-2 switch includes a control frame generating unit configured to generate a control frame having a control-purpose virtual network identifier for transmission to a working path and a protection path, wherein a set of the control-purpose virtual network identifier and at least one virtual network identifier assigned to one or more user frames is identified as a single path, a connectivity check unit configured to check connectivity of the working path and the protection path based on reception of a control frame, and a switching unit configured to switch from the working path to the protection path in response to detection, by the connectivity check unit, of fault in the working path. Such layer-2 switch is used at each end node, thereby providing path protection.

According to another aspect of the present invention, a layer-2 switch includes a control frame generating unit configured to generate a control frame having a control-purpose virtual network identifier for transmission to a working path and a protection path, wherein a set of the control-purpose virtual network identifier and at least one virtual network identifier assigned to one or more user frames is identified as a single path, a virtual network identifier inserting unit configured to insert the control-purpose virtual network identifier into one of the user frames for transmission to the working path, a virtual network identifier removing unit configured to remove the control-purpose virtual network identifier from a received one of the user frames, a connectivity check unit configured to check connectivity of the working path and the protection path based on reception of a control frame, and a switching unit configured to switch from the working path to the protection path in response to detection, by the connectivity check unit, of fault in the working path. Such layer-2 switch is used at each end node, thereby providing path protection.

According to another aspect of the present invention, the control frame may include a control protocol.

According to at least one embodiment of the present invention, path protection is achieved by making low equipment investments that only expand the function of end nodes.

BRIEF DESCRIPTION OF THE DRAWINGS

Other objects and further features of the present invention will be apparent from the following detailed description when read in conjunction with the accompanying drawings, in which:

FIG. 4 is a functional block diagram of a layer-2 switch according to the present invention;

FIG. 8 is a table chart showing a frame format of an embodiment of the control frame;

FIG. 9 is a table chart showing the detail of requirements for transmission/reception of control frames;

FIG. 12 is an illustrative drawing for explaining the filtering of control frames;

FIG. 13 is a drawing for explaining a hardware mechanism that controls path switching;

FIGS. 14A and 14B are table charts showing fault detection conditions and fault recovery conditions;

FIG. 15 is a table chart showing data elements at an end node;

FIG. 16 is a table chart showing data elements for use in the flat design;

FIG. 17 is a table chart showing data elements for use in the stack design.

DESCRIPTION OF THE PREFERRED EMBODIMENTS

In the following, embodiments of the present invention will be described with reference to the accompanying drawings.
<Network Configuration>

Figure 1:
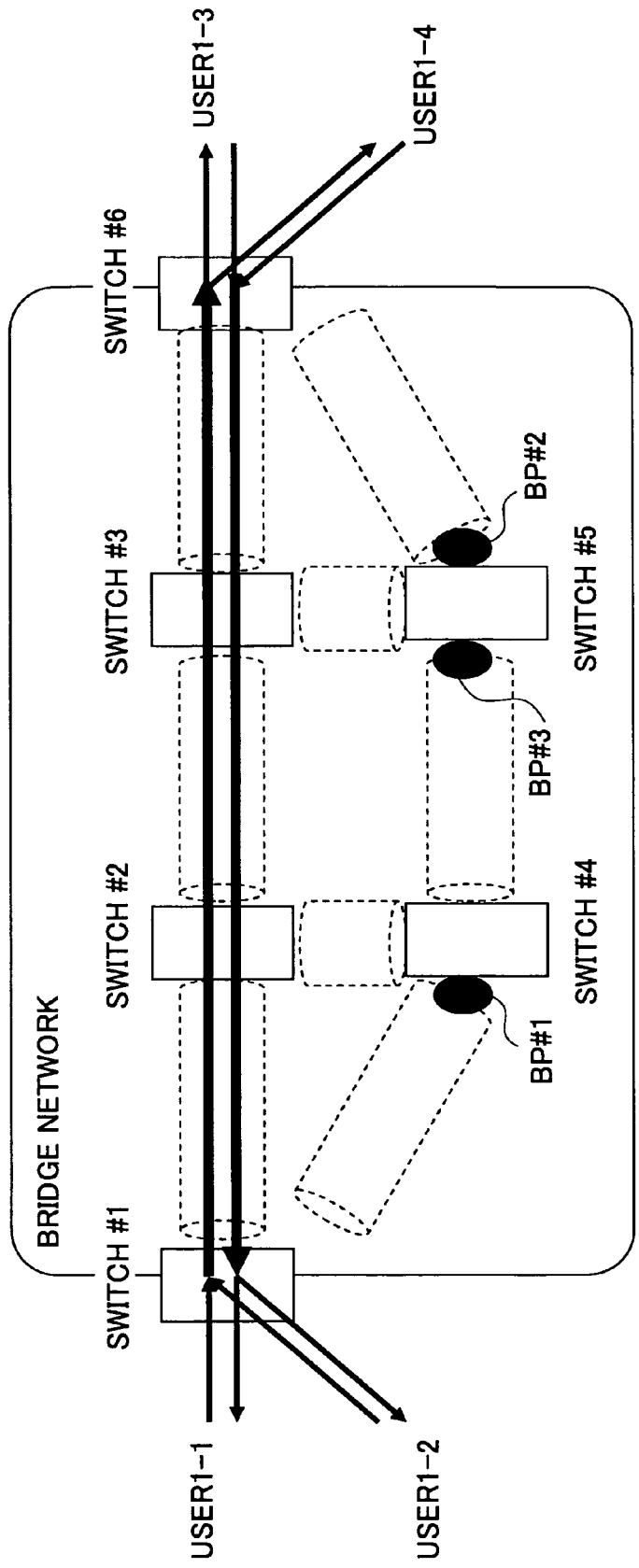
FIG. 1 is an illustrative drawing for explaining a related-art bridge network.
Figure 2:
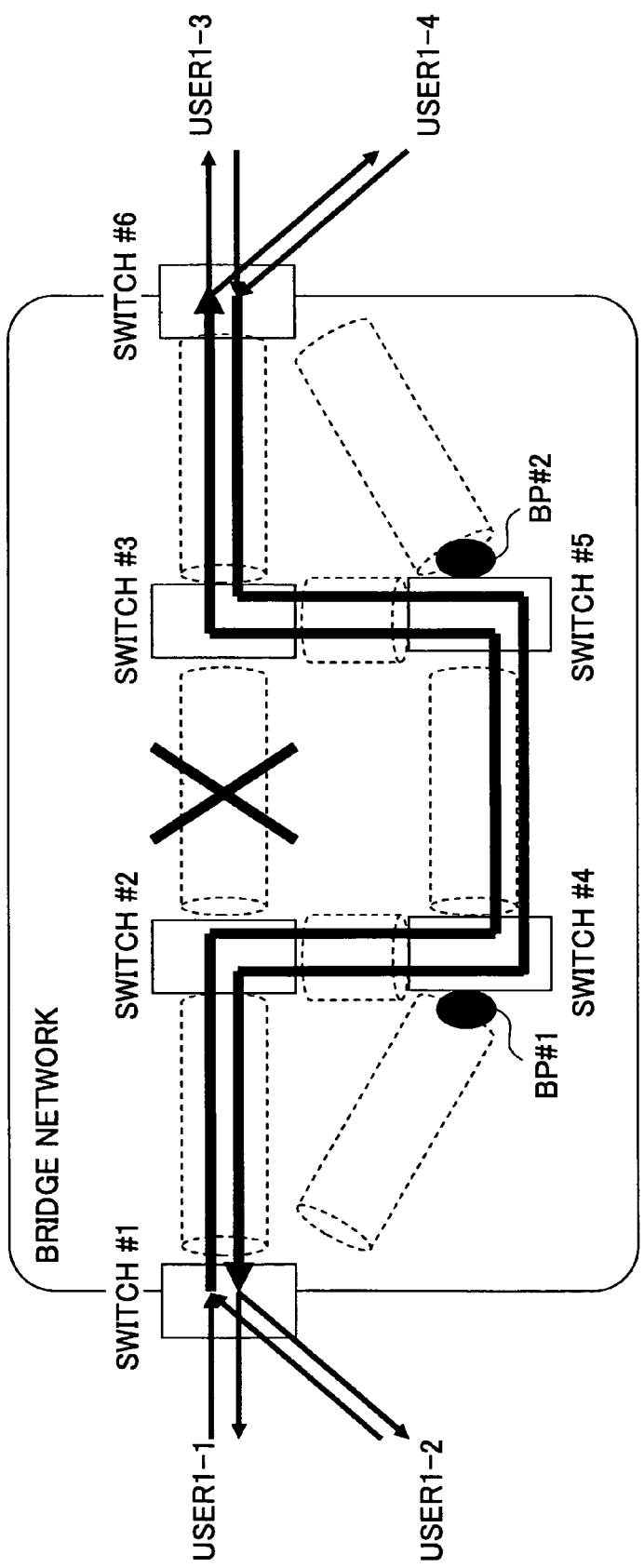
FIG. 2 is an illustrative drawing for explaining a related-art bridge network.
Figure 3:
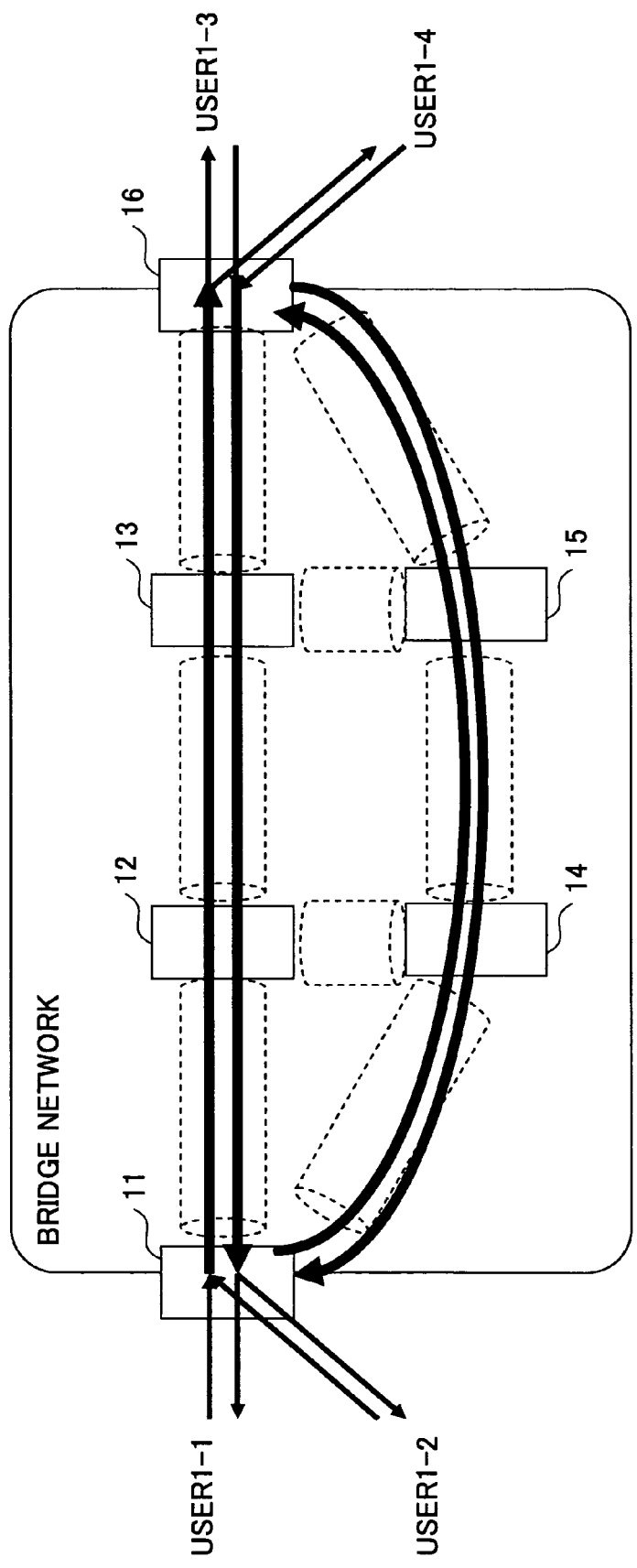
FIG. 3 is a drawing showing the configuration of an embodiment of a bridge network according to the present invention.

FIG. 3 is a drawing showing the configuration of an embodiment of a bridge network according to the present invention. In FIG. 3, layer-2 switches 11 through 16 constitute a bridge network. The layer-2 switches 11 and 16 are connected to a user terminal or to a user network that is not controlled from the bridge-network side. The layer-2 switches 11 and 16 are called end nodes because they are located at the ends of the bridge network. The layer-2 switches 12 through 15 have no connection to an external terminal or network. Since the switches 12 through 15 relay traffics passing through the bridge network, these switches are referred to as relay nodes.

In this embodiment, the end nodes 11 and 16 are coupled to each other through a point-to-point connection. The working path may be the path that passes through the layer-2 switches 11, 12, 13, and 16. The protection path may be the path that passes through the layer-2 switches 11, 14, 15, and 16. These two paths constitute a protection pair.
<Function of Layer-2 Switch>

FIG. 4 is a functional block diagram of a layer-2 switch according to the present invention. In FIG. 4, the end nodes 11 and 16 of the bridge network each include a control frame generating unit 20, a connectivity check unit 22, and a switching unit 24. In the case of the stack design, which will later be described, a tag modifying unit 26 as indicated by dotted lines is further provided.

In the bridge network on which the present invention is premised, the usage of a VLAN tag as a virtual network identifier according to IEEE802.1Q is such that a single VLAN tag is assigned to a group of user terminals or user networks that are connected through a point-to-point network topology. A point-to-multi-point connection and a multi-point-to-multi-point connection are not used as a logical network topology to which a VLAN tag is assigned.

In this embodiment, a VLAN tag as standardized according to IEEE802.1Q is used to identify objects that are to be protected between the end nodes 11 and 16. One or more VLAN tags are assigned to a path for which a single protection is performed. Further, a control protocol that is performed only at the end nodes 11 and 16 is implemented in the frames that have a control VLAN tag on a per-path basis.

For path assignment, a flat design or a stack design may be used. In the flat design, a VLAN tag assigned to a plurality of user traffics and a control-purpose VLAN tag are flat. In the stack design, frames having a VLAN tag assigned to a plurality of user traffics are stacked by a control-purpose VLAN tag.

<Flat Design>

In the following, the flat design will be described.

(1) A VLAN tag and a control-purpose VLAN tag for the protection of a protection section are provided for a point-to-point path connection.

(2) A working path (e.g., the path passing through the layer-2 switches 11, 12, 13, and 16) and a protection path (e.g., the path passing through the layer-2 switches 11, 14, 15, and 16) are set as a protection pair at the ports where these paths are included.

(3) Settings are made to the working path to specify the following conditions. VLAN tags subjected to protection are TAG#1 through TAG#9 (i.e., TAG#1-9), and a control-purpose VLAN tag is TAG#10. A control-purpose MAC address is 0x01-00-0E-00-00-01, and a control-purpose Ether Type 2 is 0xAA-AA.

(4) Settings are made to the protection path to specify the following conditions. VLAN tags subjected to protection are TAG#1 through TAG#9, and a control-purpose VLAN tag is TAG#10. A control-purpose MAC address is 0x01-00-0E-00-00-01, and a control-purpose Ether Type 2, is 0xAA-AA.

(5) Exchange of a control protocol starts in the working path and in the protection path (only the control protocol flows at this point in time).

(6) Information contained in the control protocol is used to let a main signal flow through one of the working path and the protection path. In the other path, traffics having the relevant VLAN tags (TAG#1 through TAG#10) are blocked. Blockage is applied to both transmission and reception.

Figure 5A:
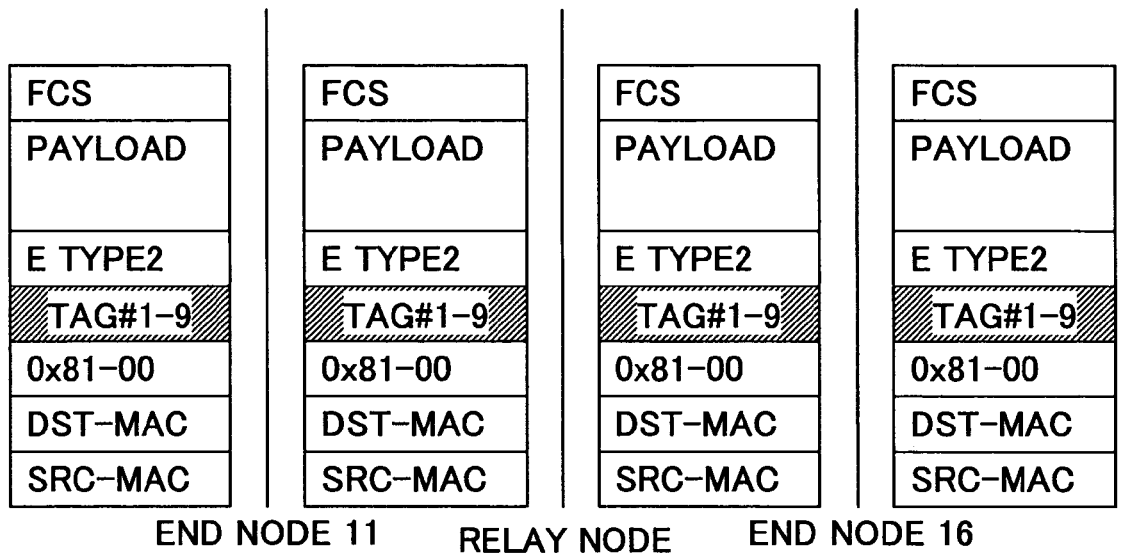
FIGS. 5A and 5B are illustrative drawings for explaining a flat design.

With this provision in the flat design, as shown in FIG. 5A, a user frame having user data in the payload with the VLAN tag TAG#1-9 is transmitted through the working path or protection path to the end node 16 (or 11) in the same flat state as it was supplied to the opposite end node 11 (or 16) of the bridge network. In FIG. 5A, DST-MAC represents a destination MAC address, SRC-MAC represents a source MAC address.

Figure 5B:
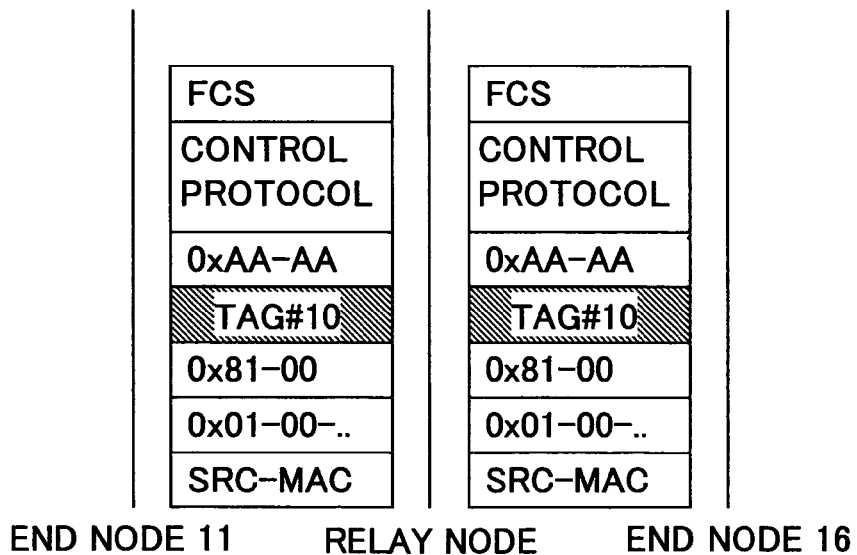

The control frame generating unit 20 at the end node 11 (or 16) generates a control frame having the control protocol in its payload with the VLAN tag TAG#10 as shown in FIG. 5B. This control frame is transmitted to the opposite end node 16 (or 11) through the working path or the protection path.

<Stack Design>

In the following, the stack design will be described.

(1) A VLAN tag for stack in the protection section is provided for a point-to-point path connection.

(2) A working path (e.g., the path passing through the layer-2 switches 11, 12, 13, and 16) and a protection path (e.g., the path passing through the layer-2 switches 11, 14, 15, and 16) are set as a protection pair at the ports where these paths are included.

(3) Settings are made to the working path to specify the following conditions. VLAN tags subjected to protection are TAG#1 through TAG#9 (i.e., TAG#1-9), and a stack-purpose VLAN tag on the working path side is TAG#10. A control-purpose MAC address is 0x01-00-0E-00-00-01, and a control-purpose Ether Type 2 is 0xAA-AA.

(4) Settings are made to the protection path to specify the following conditions. VLAN tags subjected to protection are TAG#1 through TAG#9, and a stack-purpose VLAN tag on the protection path side is TAG#11. A control-purpose MAC address is 0x01-00-0E-00-00-01, and a control-purpose Ether Type 2 is 0xAA-AA.

(5) Exchange of a control protocol starts in the working path and in the protection path (only the control protocol flows at this point in time).

(6) Information contained in the control protocol is used to let a main signal flow through one of the working path and the protection path. In the other path, traffics having the stacked VLAN tags (TAG#10 or TAG#11) are blocked. This blockage is applied to both transmission and reception.

Figure 6A:
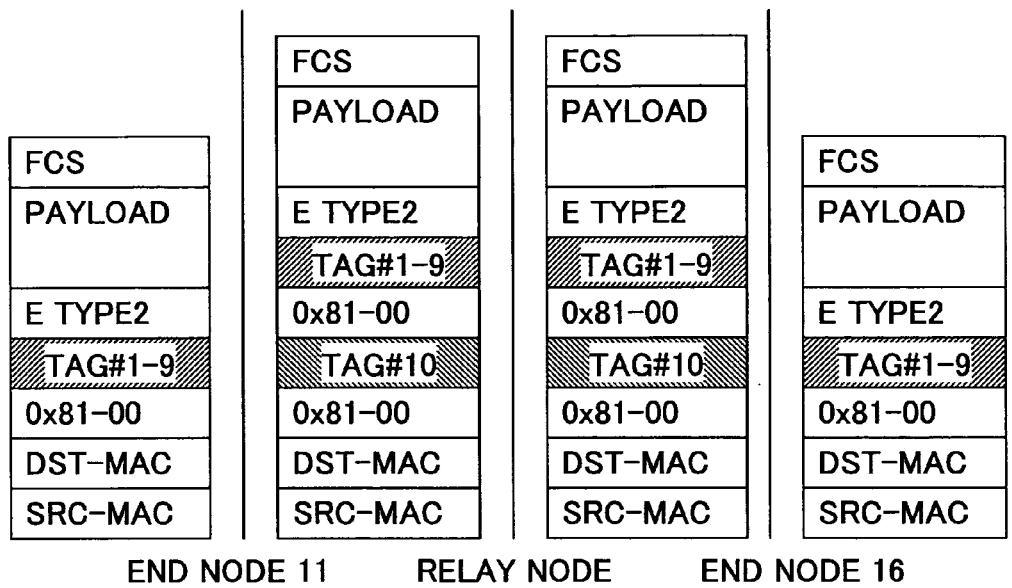
FIGS. 6A and 6B are illustrative drawings for explaining a stack design.
Figure 7A:
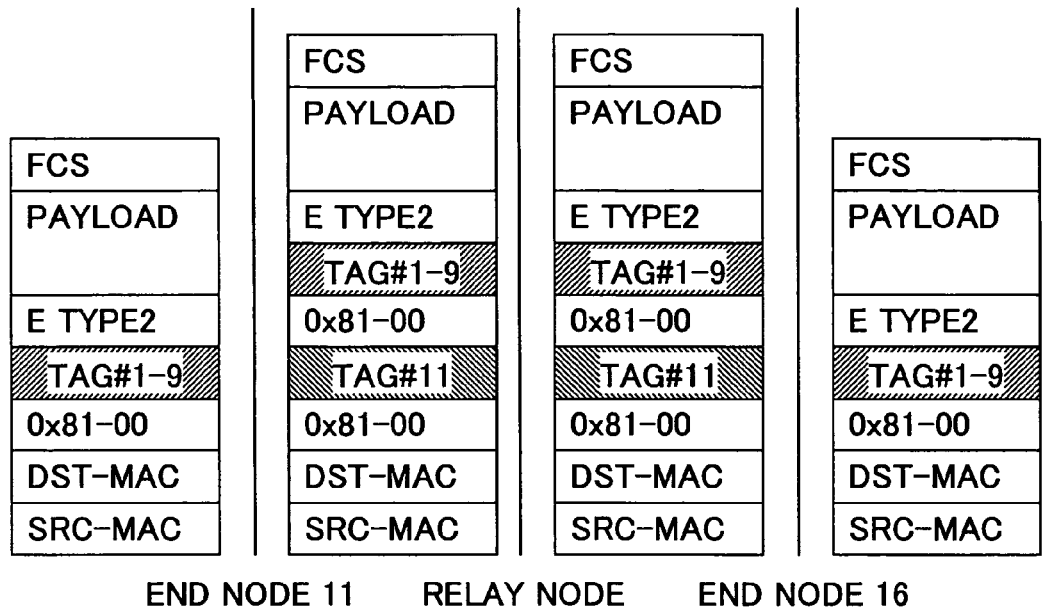
FIGS. 7A and 7B are illustrative drawings for explaining a stack design.

With this provision in the stack design, as shown in FIG. 6A, a user frame having user data in its payload with the VLAN tag TAG#1-9 has the working-path-side VLAN tag TAG#10 stacked therein at the tag modifying unit 26 of the end node 11 (or 16), and is transmitted through the working path to the opposite end node 16 (or 11) of the bridge network. Also, as shown in FIG. 7A, a user frame has the protection-path-side VLAN tag TAG#11 stacked therein at the tag modifying unit 26 of the end node 11 (or 16), and is transmitted through the protection path to the opposite end node 16 (or 11) of the bridge network.

The tag modifying unit 26 of the opposite end node 16 (or 11) removes the stacked working-path-side VLAN tag TAG#10 and the stacked protection-path-side VLAN tag TAG#11 from the received user data frames.

Figure 6B:
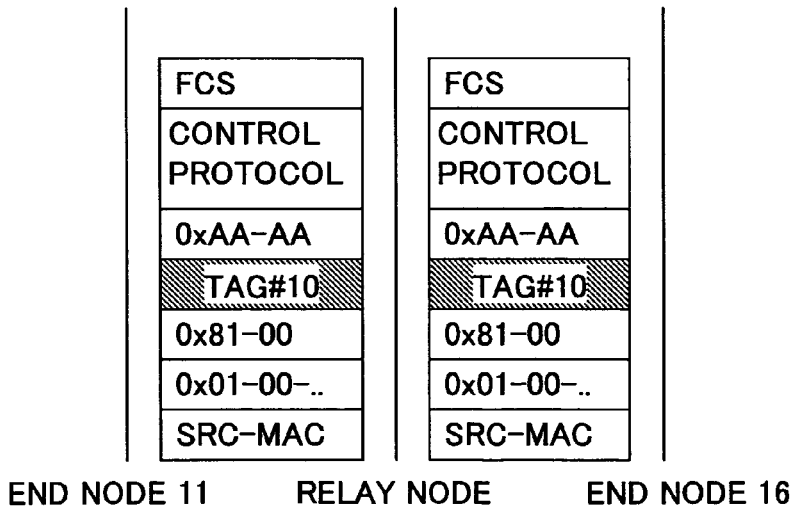
Figure 7B:
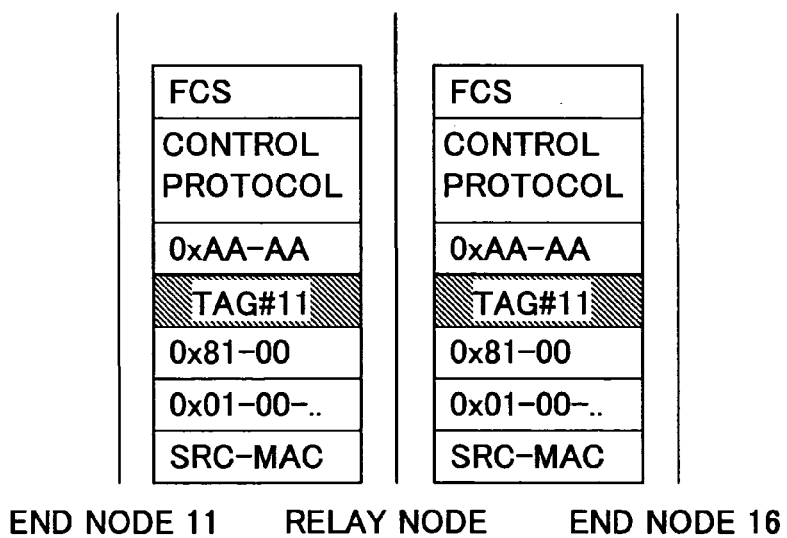

The control frame generating unit 20 at the end node 16 (or 11) generates a control frame having the control protocol in its payload with the working-path-side VLAN tag TAG#10 as shown in FIG. 6B. This control frame is transmitted to the opposite end node 11 (or 16) through the working path. Further, the control frame generating unit 20 generates a control frame having the control protocol in its payload with the protection-path-side VLAN tag TAG#11 as shown in FIG. 7B. This control frame is transmitted to the opposite end node 11 (or 16) through the protection path.

FIG. 8 is a table chart showing a frame format of an embodiment of the control frame. In FIG. 8, the destination MAC address in the MAC portion is 0x01-00-0E-00-00-01. The Ether Type 1 has an initial value of 0x8100, and is set to any value that is set to a port. VID is TAG#10 and TAG#11. The control-purpose Ether Type 2 is 0xAA-AA. The control portion includes a sequence number that is incremented to indicate a change in the control protocol when there is a change in the information (APS1, 2) following the path number, a path number indicative of a sequence number of path protection (i.e., pair of a working path and a protection path) on the transmission side, and APS1, 2 serving as the control protocol. APS1, 2 are used to send a remote fault notice and to exchange a switching trigger.

In the flat design (as described in (6)), settings are made such that information contained in the control protocol is used to let a main signal flow through one of the working path and the protection path whereas, in the other path, traffics having the relevant VLAN tags (TAG#1 through TAG#10) are blocked with respect to both transmission and reception. In the stack design (as described in (6)), on the other hand, settings are made such that the main signal is made to flow in one of the working path and the protection path whereas, in the other path, traffics having the stacked VLAN tags (TAG#10 or TAG#11) are blocked with respect to both transmission and reception. This makes it easier to make those settings.

<Function of Control Protocol>

The control protocol has functions as follows.

(1) In order to handle a relay node failure, control frames are transmitted from an end node at intervals, and the opposite end node checks the reception of the control frames. This achieves the function to check the connectivity of the path.

To this end, on the transmission side, the control frame generating unit 20 generates control frames inclusive of indications of system selection and link status, and transmits these fames at a constant interval (Ttx seconds). On the reception side, the connectivity check unit 22 checks the information contained in the control frames with local information when the control frames are properly received. If an occurrence that a control frame is not received for more than the constant interval Ttx seconds occurs more than N times (e.g., N=3: protection threshold), it is ascertained that the link is no longer usable. If a switch to another system is possible, such switch is performed.

FIG. 9 is a table chart showing the detail of requirements for transmission/reception of control frames. The transmission of control frames is performed at Ttx-second intervals or at the time of a switch event from a port including the working path and the protection path. The reception of control frames is performed at Ttx-second intervals. If a time-out occurs three times in a row, a transition to the CC-undetected (continuity-check-undetected) state is made. Then, switching is performed in response to instruction from the control protocol (APS) or in response to a RDI (Remote Defect Indication) notice.

Link aggregation as defined in IEEE802.3ad may be performed between an end node and an adjacent relay node. In such a case, when the control protocol is received from one of the ports that constitute the link aggregation, such reception is treated as indicating the proper state of the link aggregation.

Further, the control frame generating unit 20 is implemented as hardware, and is provided with the function to transmit control frames at intervals. This can avoid misjudging that the opposite node has lost connectivity when there is trouble with software operation. Namely, this provision makes it possible to upgrade software without severing the main signal (user data).

(2) The opposite end note may detect a link failure on the working path where user traffic flows. In such a case, there is a need to switch from the working path to the protection path with respect to both directions. To this end, the function to notify of a remote failure and a switch trigger is provided.

(3) The function to notify of a switch trigger is optionally provided for the case in which switching is needed upon the recovery of the working path from failure.

Another VLAN tag may be registered in addition to the VLAN tags already registered with respect to the paths on the working path ports and the protection path ports when the VLAN tag group subjected to protection are currently using the working path. This makes it possible that the bandwidth of the protection path is used for the traffic.

Further, the MAC address information of the forwarding database that is learned based on the IEEE802.1Q VLAN tags accommodated in the path is cleared at the time of a protection path switch.

<Monitoring by Connectivity Check Unit>

Figure 10:
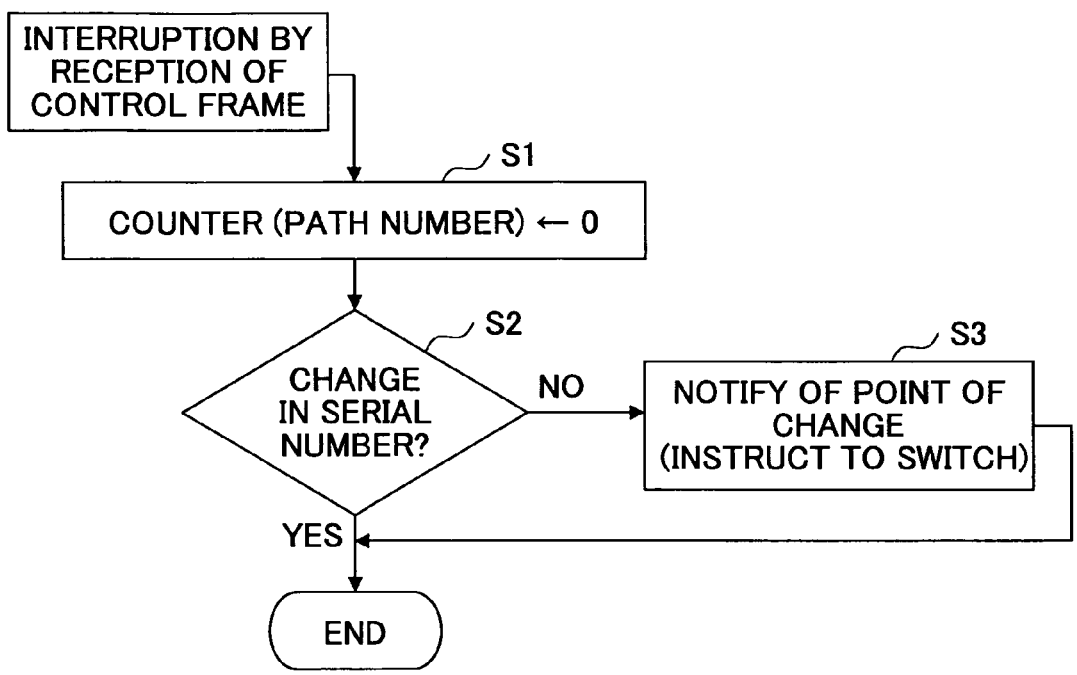
FIG. 10 is a flowchart of a monitoring process performed by a connectivity check unit.
Figure 11:
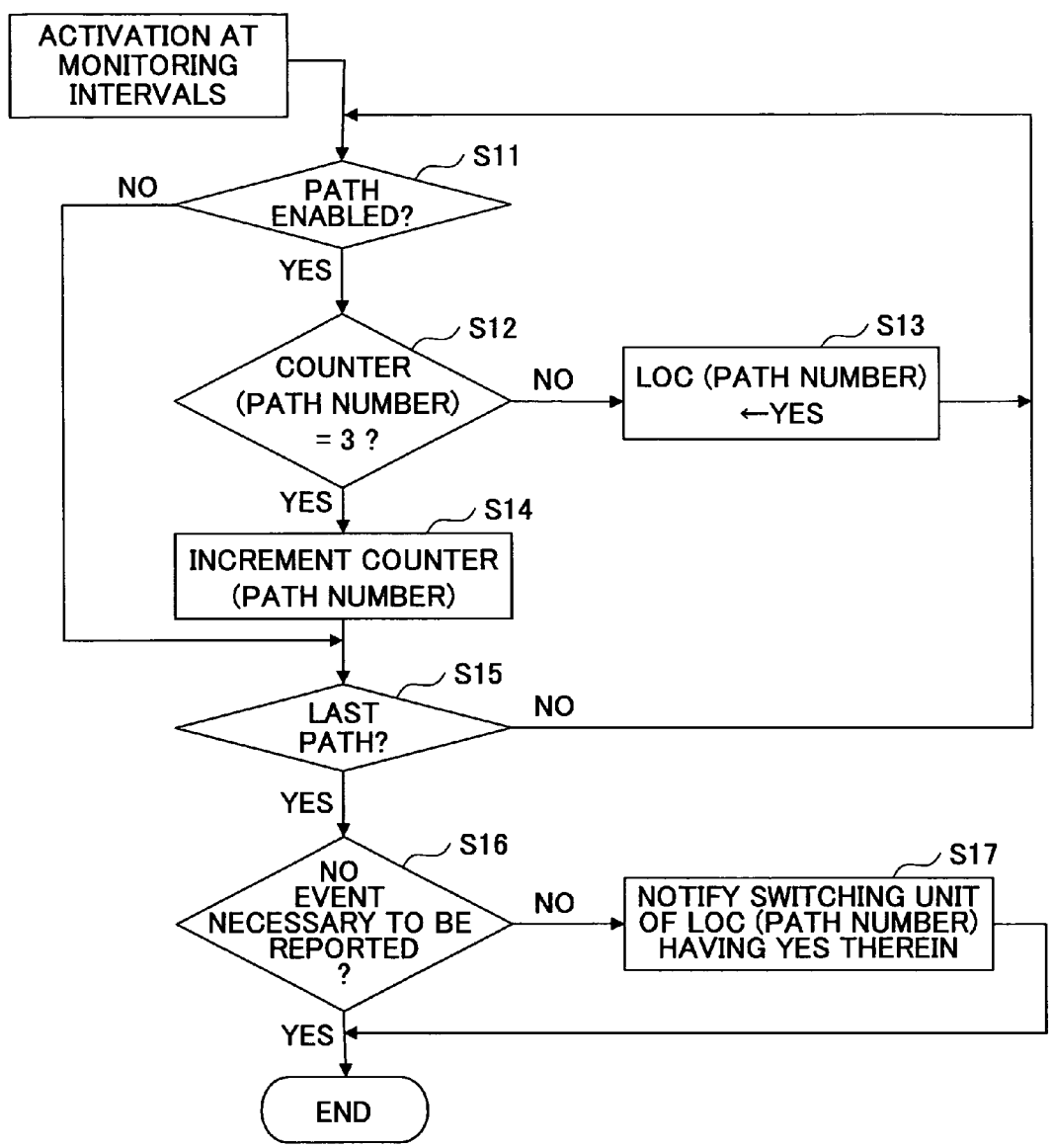
FIG. 11 is a flowchart of a monitoring process performed by a connectivity check unit.

FIG. 10 and FIG. 11 are flowcharts of a monitoring process performed by the connectivity check unit 22. The monitoring process of FIG. 10 is started upon interruption caused by the reception of a control frame. At step S1, a counter corresponding to the path number of the control frame is reset to "0". At step S2, a check is made as to whether the serial number of the received control frame shows a change from the preceding one, i.e., as to whether there is a change in the control protocol. Only when there is a change in the control protocol, the change is reported at step S3. Namely, the instruction to switch is given to the switching unit 24.

The monitoring process of FIG. 11 is activated at monitoring intervals (Trx-second intervals). At step S11, a check is performed separately for each path number as to whether the path is valid. If the path is valid, a check is performed at step S12 as to whether the counter corresponding to the path number of interest indicates 3 (protection threshold). If the counter indicates 3, "YES" is set to the LOC (path number) corresponding to the path number of interest at step S13. This blocks the reception port corresponding to the pass number of interest. The procedure then proceeds to step S11. "LOC" stands for loss of CC, and "CC" stands for continuity check.

If the count of the counter is not 3, the count of the counter corresponding to the path number of interest is incremented by one at step S14. The procedure then proceeds to step S15. The procedure also proceeds to step S15 if step S11 finds that the path is not valid. At step S15, a check is made as to whether the current path is the last path. If it is not the last path, the path number is changed, and the procedure proceeds to step S11.

If it is ascertained at step S15 that the current path is the last path, the procedure goes to step S16, at which a check is made as to whether there is an event necessary to be reported (i.e., whether there is a LOC (path number) in which "YES" is set). If there is an event necessary to be reported, the "LOC (path number)=YES" is reported to the switching unit 24 at step S17.

<Filtering of Control Frame>

There may be a case in which a plurality of paths are contained in a single physical port. Such case is shown in FIG. 12. In FIG. 12, the path #1 starts from an end node 121, passing through a node 122, and ending at an end node 123. The path #2 starts from the end node 121, passing through the nodes 122 and 123, and ending at an end node 124. In this case, filtering to terminate a control frame is performed by use of a control VLAN tag and a destination MAC address.

<Hardware Mechanism for Path Switch Control>

As shown in FIG. 13, a layer-2 switch serving as an end node includes a plurality of cards 31 through 34. Each of the cards 31 through 34 accommodates one (or more) physical port. The cards 31 through 34 include ingress filters 31I, 32I, 33I, and 34I at the ingress thereof, respectively, and include egress filters 31E, 32E, 33E, and 34E at the egress thereof, respectively, as hardware construction. These filers allow a setting to be made to determine whether a frame is allowed to pass or disposed of according to the path protection number (pair of the working path and the protection path), the port number, and the VLAN tag.

In this example, a physical port of the working path is located at the card 31, and a physical port of the protection path is located at the card 32. When the working path is a currently selected path, the ingress filter 31I and the egress filter 31E of the card 31 for the working path perform such control that the VLAN tags belonging to this path are allowed to pass. Further, the ingress filter 32I and the egress filter 32E of the card 32 for the protection path perform such control that the VLAN tags belonging to this path are disposed of.

When the protection path is a currently selected path, the ingress filter 31I and the egress filter 31E of the card 31 for the working path perform such control that the VLAN tags belonging to this path are discarded. Further, the ingress filter 32I and the egress filter 32E of the card 32 for the protection path perform such control that the VLAN tags belonging to this path are allowed to pass.

<Method of Establishing Path Protection>

When a path protection (pair of a working path and a protection path) is to be established, the following procedure will be used.

(1) A port type is set to port. Namely, ports used for the working path and the protection-path are set to the port type indicative of a port with a VLAN tag.

(2) A sequence number of path protection is registered. Namely, a sequence number 1 through 63 for management purpose is assigned.

(3) Port settings are made with respect to the ports including the control-purpose VLAN tags and the working path and the ports including the protection path. Here, a link inclusive of link aggregation may be included in place of a port.

(4) VLAN tags included in the path protection are registered.

<Method of Switching Path Protection>

The switching of path protection (pair of the working path and the protection path) is performed mainly by the software of the switching unit 24. If it is possible to control a channel chard (other than Remove and Fault) located at the switching origin from where switching is initiated, the following procedure will be performed.

(1) Reception is suspended at the port (trunk) of the switching origin (autonomous control based on LOC only with respect to a channel chard including the switching origin).

(2) Transmission is suspended at the port (trunk) of the switching origin (autonomous control based on LOC only with respect to a channel chard including the switching origin).

(3) An entry is removed from the forwarding database at the port (trunk) of the switching origin (with respect to all the channel cards).

(4) An instruction to switch is transmitted from the port (trunk) of the switching destination.

(5) Reception is started at the port (trunk) of the switching destination (only with respect to the channel cards that include the switching destination).

(6) Transmission is started at the port (trunk) of the switching destination (only with respect to the channel cards that include the switching destination).

If the channel card located at the switching origin is not controllable (Remove and Fault), steps 13 through 16 as described above are performed.

<Protection Control During Upgrade>

During the upgrading of the software of the connectivity check unit 22, the switching unit 24, etc., there is a time period during which hardware cannot be controlled directly. In order to prevent the apparatus at the opposite end from detecting a LOC, the function to allow the hardware of the control frame generating unit 20 to transmit control frames autonomously is enabled so as to prevent switching from being performed before the upgrading. This ensures that connectivity is confirmed during the upgrading process, thereby preventing the main signal from being severed. The procedure for this control is shown in the following.

(1) Hardware-based autonomous transmission of control frames is started.

(2) A normal upgrading process is performed.

(3) Hardware-based autonomous transmission of control frames is terminated (followed by the software process based on the connectivity check unit 22, the switching unit 24, etc.).

<Fault Detection & Recovery Process>

FIGS. 14A and 14B are table charts showing fault detection conditions and fault recovery conditions.

The causes of fault detection includes a LOC (loss of CC), reception of APS (Automatic Protection Switching: instruction to switch), the malfunction/removal of a chard having a port including a working/protection path, the stoppage of optical input into a port including a working/protection path, 10B8B conversion error, frequent occurrences of FCS error, physical failure such as the failure/removal of an SFP (Small Form Factor Pluggable) module, and an operator-switching request command. The causes of fault recovery include the time of CC reception (instantaneous), reception of APS (Automatic Protection Switching: instruction to switch), the malfunction/removal of a chard having a port including a working/protection path, the stoppage of optical input into a port including a working/protection path, 10B8B conversion error, frequent occurrences of FCS error, and physical failure such as the failure/removal of an SFP (Small Form Factor Pluggable) module.

<Data Element at End Node>

FIG. 15 is a table chart showing data elements at an end node. As system-specific data, the data elements include a control-purpose MAC address, a control-purpose Ether type, and control-frame-purpose Cos. As protection-specific data, the data elements include a protection link type (port link aggregation), a protection VLAN tag list, a protection start instruction (start/end), a protection state (operating, closing, unused), a selected path (working path/protection path), a switchback timer (in increments of minutes), a control frame transmission interval (in increments of milliseconds), a control frame reception interval and (in increments of milliseconds) With respect to a link inclusive of the working path, the data elements include a working path state (operating, fault, closing, unused), a control-purpose VLAN tag, a control frame transmission instruction (start/stop), a control frame reception instruction (start/stop), and VLAN STACKING (enabled/disabled). With respect to a link inclusive of the protection path, the data elements include a protection path state (operating, fault, closing, unused), a control-purpose VLAN tag, a control frame transmission instruction (start/stop), a control frame reception instruction (start/stop), and VLAN STACKING (enabled/disabled).

As port-specific data, the data elements include a port state (operating, fault, closing, unused), a protection path use list, a permitted VLAN tag list, and the use of link aggregation (in use/not infuse). As link-aggregation-specific data, the data elements include a link state (operating, fault, closing, unused), a protection path use list, a permitted VLAN tag list, and a port use list.

FIG. 16 is a table chart showing data elements for use in the flat design. FIG. 17 is a table chart showing data elements for use in the stack design. The data elements shown in FIG. 16 and FIG. 17 correspond to those shown in FIG. 15.

According to the embodiment described above, the following results are achieved.

(1) The use of end nodes to which the present invention is applied makes it possible to establish an end-node-to-end-node path protection without expanding or replacing relay nodes. This achieves improvements in network fault tolerance.

(2) Since the expansion or replacement of relay nodes is not necessary, there is no need for additional equipment investments in respect of the relay nodes. An existing network can be utilized as a relay network, which makes introduction to the network easier.

(3) Software can be upgraded without having a switching process taking place at another node.

(4) VLAN tags standardized by IEEE802.1Q are employed to achieve handling as a path. This makes it possible to select a path on the network administrator side, thereby distributing the traffic load.

(5) The intervals at which frame arrivals are checked may be shortened. This makes it possible to detect a path disconnection promptly and to perform switching within one second.

(6) The number of passable VLAN tags complying with IEEE802.1Q may be set to a larger number at a port including a protection path than at a port including the working path. With this provision, an available band of the protection path that passes no traffic while the working path is properly operating may be used to transmit excess VLAN-tag user traffic.

Further, the present invention is not limited to these embodiments, but various variations and modifications may be made without departing from the scope of the present invention.

The present application is based on Japanese priority application No. 2005-303363 filed on Oct. 18, 2005, with the Japanese Patent Office, the entire contents of which are hereby incorporated by reference.

What is claimed is:

1. A method of providing path protection in a bridge network formed by layer-2 switches connected together, comprising:
    setting a working path and a protection path by identifying, as a single path, a set of a control-purpose virtual network identifier and at least one virtual network identifier that are assigned to one or more users at a section defined as a point-to-point connection in a virtual network;
    exchanging a control protocol both in the working path and in the protection path;
    causing a main signal to flow through one of the working path and the protection path based on information contained in the exchanged control protocol; and
    switching between the working path and the protection path upon detecting a fault in either one of the working path and the protection path, said detection of the fault occurring after the step of exchanging a control protocol both in the working path and in the protection path, the control protocol having a function to check connectivity of both the working path and the protection path.

2. A method of providing path protection in a bridge network formed by layer-2 switches connected together, comprising:
    setting a working path and a protection path by identifying, as a single path, at least one virtual network identifier that is assigned to one or more users at a section defined as a point-to-point connection in a virtual network and that has a control-purpose virtual network identifier stacked therewith;
    exchanging a control protocol both in the working path and in the protection path;
    causing a main signal to flow through one of the working path and the protection path based on information contained in the exchanged control protocol; and
    switching between the working path and the protection path upon detecting a fault in either one of the working path and the protection path, said detection of the fault occurring after the step of exchanging a control protocol both in the working path and in the protection path, the control protocol having a function to check connectivity of both the working path and the protection path.

3. A layer-2 switch, comprising: a control frame generating unit configured to generate a control frame having a control-purpose virtual network identifier for transmission to a working path and a protection path, wherein a set of the control-purpose virtual network identifier and at least one virtual network identifier assigned to one or more user frames is identified as a single path;
    a connectivity check unit configured to check connectivity of both the working path and the protection path based on reception of a control frame; and
    a switching unit configured to switch from the working path to the protection path in response to detection, by said connectivity check unit, of fault in the working path, said detection of fault occurring after transmitting a control frame to both the working path and the protection path to check connectivity of both the working path and the protection path.

4. A layer-2 switch, comprising:
    a control frame generating unit configured to generate a control frame having a control-purpose virtual network identifier for transmission to a working path and a protection path, wherein a set of the control-purpose virtual network identifier and at least one virtual network identifier assigned to one or more user frames is identified as a single path;
    a virtual network identifier inserting unit configured to insert the control-purpose virtual network identifier into one of the user frames for transmission to the working path;
    a virtual network identifier removing unit configured to remove the control-purpose virtual network identifier from a received one of the user frames;
    a connectivity check unit configured to check connectivity of both the working path and the protection path based on reception of a control frame; and
    a switching unit configured to switch from the working path to the protection path in response to detection, by said connectivity check unit, of fault in the working path, said detection of fault occurring after transmitting a control frame to both the working path and the protection path to check connectivity of both the working path and the protection path.

5. The layer-2-switch as claimed in claim 3, wherein the control frame includes a control protocol.

6. The layer-2-switch as claimed in claim 4, wherein the control frame includes a control protocol.

7. The layer-2-switch as claimed in claim 3, wherein said control frame generating unit is configured to transmit the control frame at constant intervals.

8. The layer-2-switch as claimed in claim 7, wherein said connectivity check unit is configured to detect fault in the working path or protection
    path if the control frame is not received from the working path or protection path for a predetermined number of times.

9. The layer-2-switch as claimed in claim 7, wherein said control frame generating unit is configured to transmit the control frame at constant intervals through hardware-based autonomous operation.

10. The layer-2-switch as claimed in claim 7, wherein said connectivity check unit is configured to ascertain that connectivity is confirmed with respect to all physical ports belonging to link aggregation if the control frame is received at a port to which said link aggregation is set.

11. The layer-2-switch as claimed in claim 4, wherein said control frame generating unit is configured to transmit the control frame at constant intervals.

12. The layer-2-switch as claimed in claim 11, wherein said connectivity check unit is configured to detect fault in the working path or protection path if the control frame is not received from the working path or protection path for a predetermined number of times.

13. The layer-2-switch as claimed in claim 11, wherein said control frame generating unit is configured to transmit the control frame at constant intervals through hardware-based autonomous operation.

14. The layer-2-switch as claimed in claim 11, wherein said connectivity check unit is configured to ascertain that connectivity is confirmed with respect to all physical ports belonging to link aggregation if the control frame is received at a port to which said link aggregation is set.

* * * * *